United States Patent [19]

Wallis

[11] 3,883,945
[45] May 20, 1975

[54] METHOD FOR TRANSFERRING AND JOINING BEAM LEADED CHIPS
[75] Inventor: George Wallis, Lexington, Mass.
[73] Assignee: P. R. Mallory & Co. Inc., Indianapolis, Ind.
[22] Filed: Mar. 13, 1974
[21] Appl. No.: 450,599

[52] U.S. Cl. .............. 228/176; 29/626; 228/180; 228/234
[51] Int. Cl. .................. B23k 19/00; H05k 3/30
[58] Field of Search ................ 29/471.1, 626

[56] References Cited
UNITED STATES PATENTS

| | | | |
|---|---|---|---|
| 3,486,223 | 12/1969 | Butera | 29/471.1 X |
| 3,575,333 | 4/1971 | Kulicke et al. | 29/471.1 X |
| 3,617,682 | 11/1971 | Hall | 29/471.1 X |
| 3,695,501 | 10/1972 | Radobenko | 29/626 X |
| 3,699,640 | 10/1972 | Cranston et al. | 29/471.1 |
| 3,742,181 | 6/1973 | Costello | 29/471.1 X |

Primary Examiner—Al Lawrence Smith
Assistant Examiner—James G. Smith
Attorney, Agent, or Firm—Charles W. Hoffmann; Robert F. Meyer; Donald W. Hanson

[57] ABSTRACT

Beam leaded semiconductive chips are retrieved from a tight matrix by applying a partial vacuum to a chip through a tube that is slidable in a sleeve of the transferring and joining device, the chip then being transferred to and joined to a circuit board.

3 Claims, 3 Drawing Figures

PATENTED MAY 20 1975    3,883,945

METHOD FOR TRANSFERRING AND JOINING BEAM LEADED CHIPS

Generally speaking, in the present invention, there is provided an improvement in a method of transferring beam leaded chips and bonding them to a circuit board wherein a multiplicity of the chips are carried in a tight matrix and the chips are individually retrieved from the tight matrix by application of a partial vacuum to the chip and after the tight matrix has been expanded applying a partial vacuum to a chip to permit an individual chip to be retrived from the expanded matrix, the improvement comprising eliminating the need for expanding the tight matrix by providing a heated sleeve, a tube slideably carried in a bore of the sleeve, and means applying a vacuum pressure to the tube and then retrieving the chips from the tight matrix and bonding them to the circuit board by positioning the sleeve in line with a chip, advancing the tube beyond the sleeve to engage the chip, applying a partial vacuum to the tube to hold the chip against an end of the tube, transferring the chip to the circuit board, retracting the tube to hold the chip against an end of the sleeve, and joining the chip to the circuit board.

Beam leaded chips are normally formed on a backing disc on which they are waxed down in a tight matrix. Each chip is then individually retrieved by a very small tube through the application of a partial vacuum and located on a silicone covered storing disc in a less tight or expanded matrix. From such storage disc, individual chips are retrieved by a bonding tool and bonded to a circuit board.

The primary purpose of the step of transferring chips to an expanded matrix is to make it feasible for a bulky bonding tool to pick up one chip without disturbing neighboring chips. Since the step is a very time consuming and costly one, it would be highly desirable to eliminate it.

Accordingly, it is a feature of the present invention to provide a method of transferring beam leaded chips from a tight matrix and joining the chips to a circuit board. Another feature of the invention is to join beam leaded chips to a circuit board through thermal compression joining. Still another feature of the invention is to provide a combination vacuum pickup and joining tool. Another feature of the invention is to provide a combination vacuum pickup and joining tool which includes a tube slideably carried in a sleeve with the sleeve acting as the joining tool and the tube acting as the vacuum pickup. Yet another feature of the invention is to provide an improved method of transferring and bonding beam leaded chips wherein the very costly step of transferring the chips from a tight matrix to an expanded matrix is eliminated.

These and other features of the invention will become apparent from the following description taken in conjunction with the accompanying drawings wherein.

Figure 1:
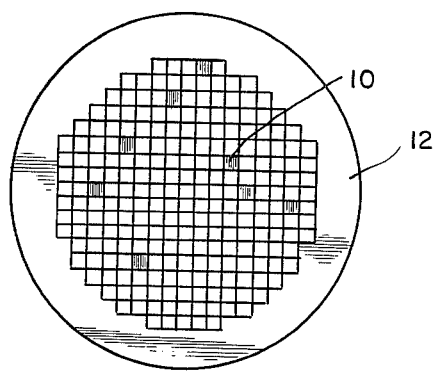
FIG. 1 is a top view of a disc carrying a multiplicity of beam leaded chips.

Referring to the drawings, and more particularly to FIG. 1, a multiplicity of beam leaded devices or chips 10, such as transistors, are usually formed on a backing disc 12 in a waxed down tight matrix. The individual chips are then transferred to a silicone covered storage disc in an "expanded" matrix, the chips then being cleaned for storage. The individual chips are usually picked up by a very small vacuum pickup tool from the backing disc. Then a larger bonding tool is used to pick up an individual chip from the expanded matrix and the chip bonded to a circuit board.

Figure 2:
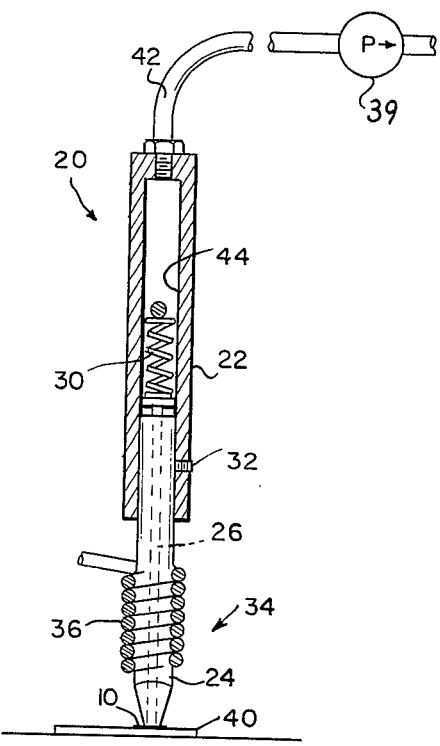
FIG. 2 is a cross-section of a combination pickup and joining tool useful in carrying out the method of the invention.
Figure 3:
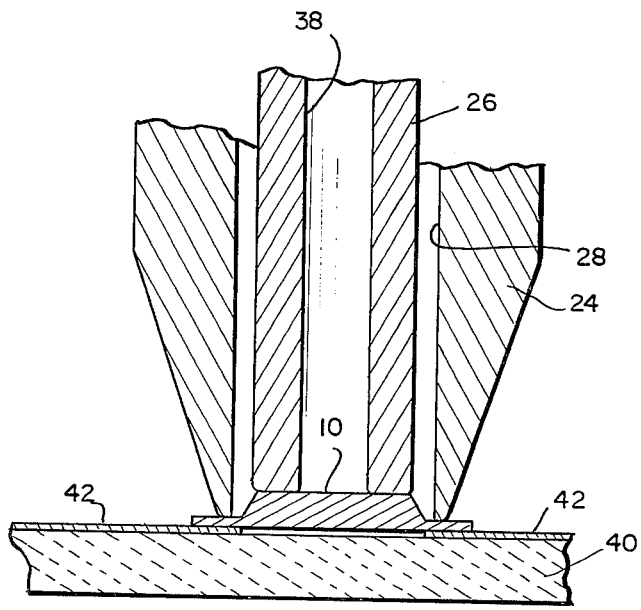
FIG. 3 is an enlarged cross-section taken from FIG. 2, showing the combination pickup and joining tool and its relationship to a beam leaded chip and to a substrate to which it is being attached.

According to the present invention the costly step of transferring individual chips to an "expanded" matrix is eliminated by providing a combination vacuum pickup and joining tool such that the individual chips 10 may be retrieved from backing disc 12 without bothering a neighboring chip to be directly joined to a substrate such as a circuit board. Referring particularly to FIGS. 2 and 3, there is provided a combination vacuum pickup and joining tool 20 which generally includes a holder 22 in which is carried a sleeve 24, and a tube 26 that is axially movable within bore 28 of the sleeve. The tube is spring biased through a coil spring 30, the tube being axially movable through a suitable means such as a lever or piston (not shown). Sleeve 24 is set within holder 22 through a set screw 32. The sleeve is heated through a heating means 34 such as a heating coil 36. A partial vacuum is applied through the bore 38 of the tube through a vacuum pump 39 which creates a partial vacuum through conduit 42, bore 44 of holder 22, andd thus through bore 38.

In operation, the combination vacuum pickup and joining tool is positioned over an individual chip 10 and lowered into close proximity to the chip. Tube 26 is lowered to engage a chip, and a partial vacuum is applied to retrieve the chip from the tight matrix and hold it against the end of the tube.

The combination vacuum pickup and joining tool is then positioned over a circuit board 40 having electrical circuit paths 42. Tube 26 is centered over the board and lowered to properly engage chip 10 with the circuit paths 42. Tube 26 is retracted into sleeve 24 against the pressure of coil spring 30 until the chip engages the sleeve. Heat is applied to the sleeve through coil 36 to join the chip to the paths through thermal compression bonding.

I claim:

1. A method of transferring semiconductive chips from a backing disc and joining them to a substrate comprising:
   A. providing:
      a. a heated sleeve
      b. a tube slideably carried in a bore of said sleeve,
      c. means applying a partial vacuum to said tube, and
   B. retrieving said semiconductive chips from said backing disc and joining them to a circuit board by:
      a. positioning said sleeve in a line with a chip,
      b. advancing said tube beyond an end of said sleeve to engage said chip
      c. applying a vacuum pressure to said tube to hold said chip against an end of said tube;
      d. transferring said chip to align it with said substrate,
      e. retracting said tube to hold said chip against said sleeve, and
      f. joining said chip to said substrate.

2. A method according to claim 1 wherein said substrate is a circuit board having electrically conductive paths, and said chip is aligned with said paths.

3. A method according to claim 1 wherein said chip is joined to said substrate through heat and pressure.

* * * * *